Figure 1:
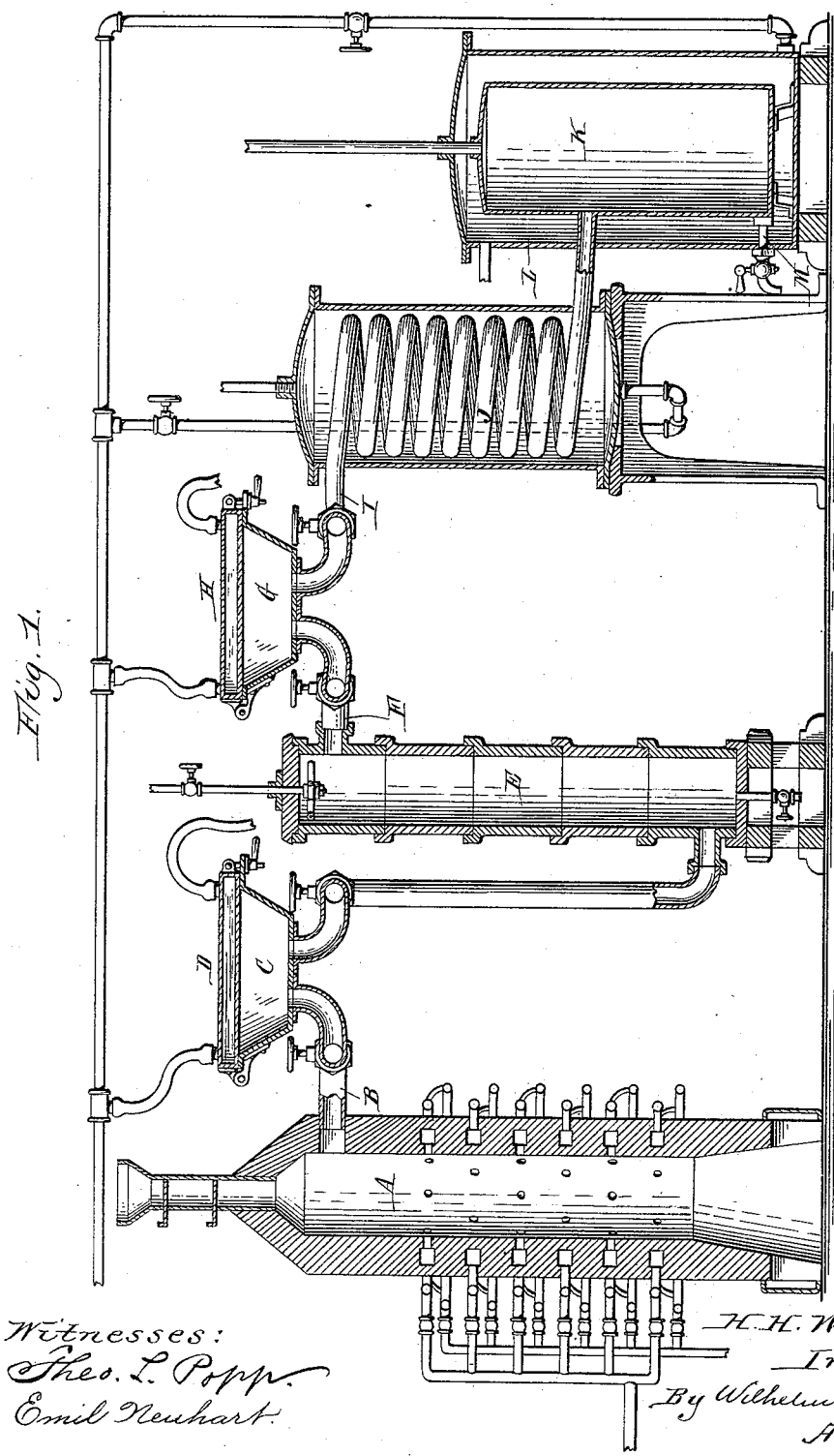

(No Model.) 2 Sheets—Sheet 1.

H. H. WING.
PROCESS OF OBTAINING BROMINE AND IODINE.

No. 447,926. Patented Mar. 10, 1891.

Witnesses:
Theo. L. Popp
Emil Neuhart

H. H. Wing,
Inventor
By Wilhelm & Bonner
Attorneys.

(No Model.) 2 Sheets—Sheet 2.
H. H. WING.
PROCESS OF OBTAINING BROMINE AND IODINE.
No. 447,926. Patented Mar. 10, 1891.
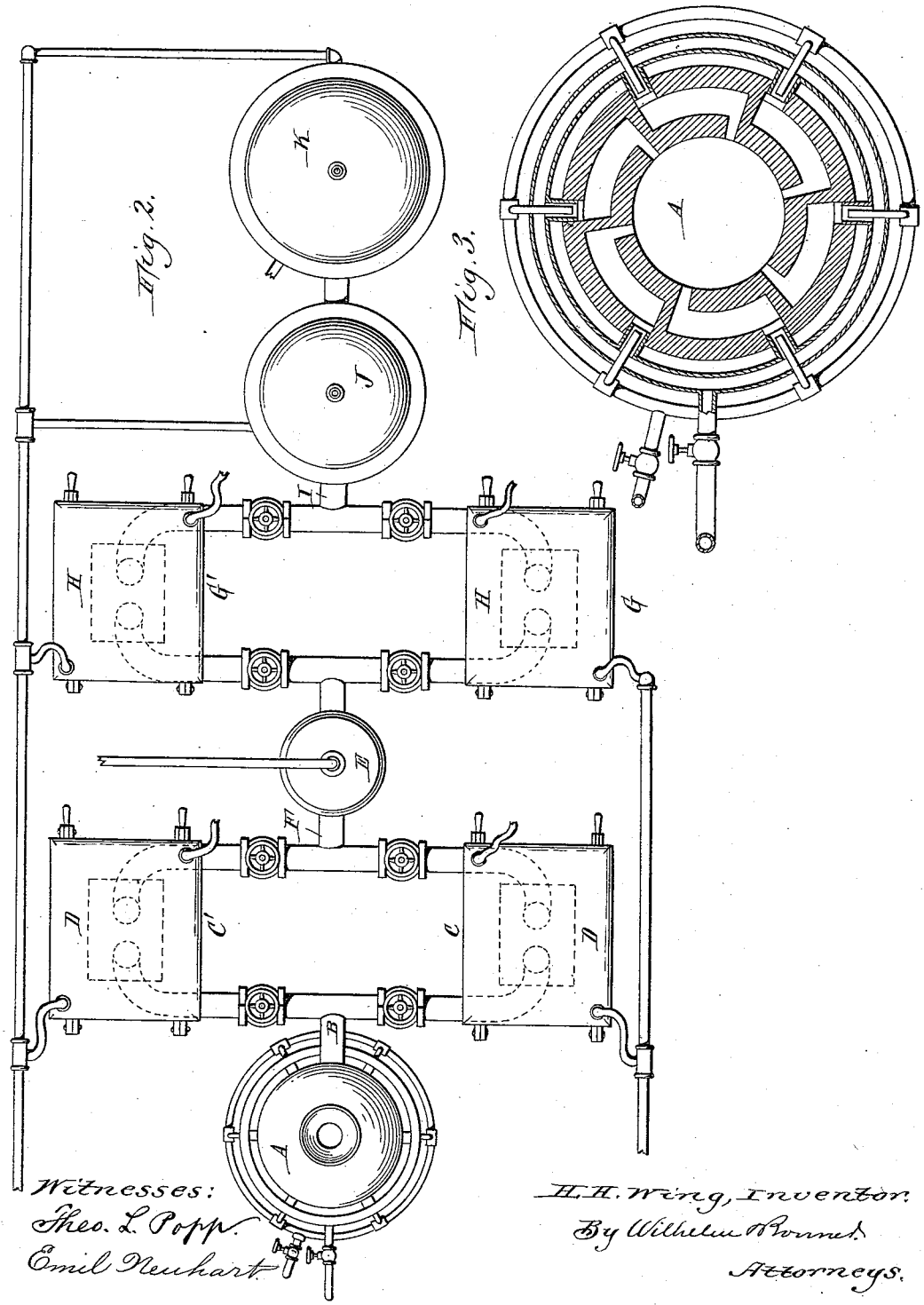

UNITED STATES PATENT OFFICE.

HERBERT H. WING, OF BUFFALO, NEW YORK.

PROCESS OF OBTAINING BROMINE AND IODINE.

SPECIFICATION forming part of Letters Patent No. 447,926, dated March 10, 1891.

Application filed October 2, 1890. Serial No. 366,824. (No specimens.)

*To all whom it may concern:*

Be it known that I, HERBERT H. WING, a citizen of the United States, residing at the city of Buffalo, in the county of Erie and State of New York, have invented a new and useful Improvement in the Method of Manufacturing Bromine and Iodine, of which the following is a specification.

This invention relates to the manufacture of bromine from bittern, and has the object to produce bromine of pure quality in a simple and inexpensive manner, and, further, to produce iodine at the same time when the bittern contains iodine in paying quantities. I will describe my newly-invented method as applied to bittern, which contains both bromine and iodine combinations in paying quantities.

The accompanying drawings, consisting of two sheets, represent an apparatus suitable for practicing my invention as applied to the treatment of such bittern.

In the drawings, Figure 1 is a sectional elevation of the apparatus. Fig. 2 is a top plan view thereof. Fig. 3 is a horizontal section in line $x$ $x$, Fig. 1, on an enlarged scale.

Like letters of reference refer to like parts in the several figures.

In practicing my invention the bittern or mother-liquor of the salt manufacture containing bromine and iodine combinations is concentrated by evaporation until it attains a sirupy consistency. I then mix it with clay or some other silicious material which has first been reduced to a fine state of division. This plastic mass is thoroughly worked and mixed in a pugging-mill or mixing-machine and then molded into balls of from two to three inches in diameter. These balls are dried, and when hard are placed in a kiln or furnace A and calcined at a high temperature to a semi-fused mass. The furnace may be heated by gaseous fuel, in which case it is provided with gas-burners and blast-pipes, as shown, or coal or coke may be employed. At the high heat of calcination the silica of the clay or other silicious material expels the chlorine, bromine, and iodine contained in the bittern. These vapors or gases and the products of combustion escape from the top of the furnace by a pipe B, which opens upwardly into a subliming-chamber C. The top plate of this chamber is covered with a water-jacket D to keep the top plate cool and cause the iodine contained in the vapor to be deposited against the same. The vapors and gases pass from the subliming-chamber to the foot of a tower E, which is filled with coke or broken porcelain-ware. Bittern is introduced into the top of the tower by a sprinkler and in trickling down through the tower comes in contact with the gases and vapors, which pass upwardly through the tower. The bittern used in the tower is not concentrated, but of ordinary condition, and the supply is so regulated that it is kept at a temperature of from 143° to 200° Fahrenheit in trickling through the tower. The chlorine contained in the gases drives out all of the bromine and iodine contained in the bittern, and the gases containing the bromine liberated in the furnace, together with the bromine and iodine liberated in the tower, escape from the top of the tower through a pipe F. This pipe opens upwardly into a second subliming-chamber G, which is provided on its top plate with a water-jacket H, and in which the iodine contained in the gases is deposited. The greater part of the iodine remains in the liquid, which passes off at the bottom of the tower, and this iodine is recovered by filtering and resubliming. The bromine, which is a vapor above the temperature of 143° Fahrenheit, passes from the second subliming-chamber by a pipe I into a worm or condenser J, in which it is condensed. The liquid escaping from the tail of the worm is collected in a receiver K, which may be provided with a water-jacket L for keeping it cool and from which the liquid bromine can be drawn by a pipe M. The liquid which escapes from the bottom of the tower consists of a solution of chlorides and free iodine, the chlorine having taken the place of the bromine and iodine in the combinations. The bromine so obtained is of pure quality, as all chlorine compounds of bromine have been decomposed in the tower, and the material of which the tower, condenser, and passages are constructed is stoneware or some other material which is not attacked by bromine. The iodine is recovered upon raising the covers of the subliming-chambers, which are provided with hinges and releasable fastenings for that purpose.

When it is desired to make the operation continuous, I use two sets of subliming-chambers C G and C' G', so connected with the furnace, tower, and condenser by pipes and valves, as represented in Fig. 2, that one set may be in operation while the iodine is being removed from the other set.

When the bittern does not contain iodine in sufficient quantity to make its recovery desirable, the subliming-chambers are omitted and the pipes extend directly from the top of the furnace to the foot of the tower and from the top of the latter to the condenser.

I claim as my invention—

1. In the manufacture of bromine, the method of producing fumes containing chlorine and bromine, which consists in mixing bittern with silicious material and calcining the mixture, substantially as set forth.

2. The method of producing bromine, which consists in calcining a mixture of bittern and silicious material, bringing the resulting fumes which contain chlorine and bromine in contact with bittern, and collecting the resulting bromine, substantially as set forth.

3. In the manufacture of bromine, the method of producing iodine as a by-product, which consists in calcining a mixture of bittern and silicious material and collecting the sublimed iodine, substantially as set forth.

4. The herein-described method of producing bromine and iodine, which consists in calcining a mixture of bittern and silicious material, whereby fumes containing chlorine, bromine, and iodine are formed, collecting the sublimed iodine, bringing the remaining fumes in contact with bittern-water, whereby the bromine and iodine contained in the same are liberated, and collecting the liberated iodine and bromine, substantially as set forth.

Witness my hand this 29th day of September, 1890.

HERBERT H. WING.

Witnesses:
CARL F. GEYER,
FRED. C. GEYER.